United States Patent [19]
Kellam

[11] 3,747,565
[45] July 24, 1973

[54] ARTICLE OF ANIMAL APPAREL

[76] Inventor: Anne Marie Kellam, Fleetwood Manor, Jeffersonton, Va. 22724

[22] Filed: Nov. 23, 1971

[21] Appl. No.: 201,284

[52] U.S. Cl. .......................... 119/1, 36/2.5 P, 54/82
[51] Int. Cl. .............................................. A43b 3/00
[58] Field of Search ..................... 119/1; 54/82, 79; 168/1-3; 36/1.5, 2.5 P; 2/22

[56] References Cited
UNITED STATES PATENTS

| | | | |
|---|---|---|---|
| 601,974 | 4/1898 | Meissner | 54/82 X |
| 3,150,641 | 9/1964 | Kesh | 54/79 X |
| 665,530 | 1/1901 | Johnson | 168/2 |
| 2,253,837 | 8/1941 | Augspurger | 54/82 X |
| 2,443,831 | 6/1948 | Miller | 36/2.5 P X |
| 2,408,575 | 10/1946 | Norvig | 54/79 X |
| 2,163,361 | 6/1939 | Ford et al. | 168/2 |
| 3,209,726 | 10/1965 | Fisher | 119/1 |

Primary Examiner—Louis G. Mancene
Assistant Examiner—J. A. Oliff
Attorney—Thomas B. Van Poole et al.

[57] ABSTRACT

An article of animal apparel adapted to facilitate the bathing of an animal generally including a pair of boots adapted to be worn on a pair of animal's paws, and means secured to the boots and extendable along the leg and body portions of the animal and across the back thereof when the boots are worn on the animal's paws, to retain the boots on the paws.

7 Claims, 4 Drawing Figures

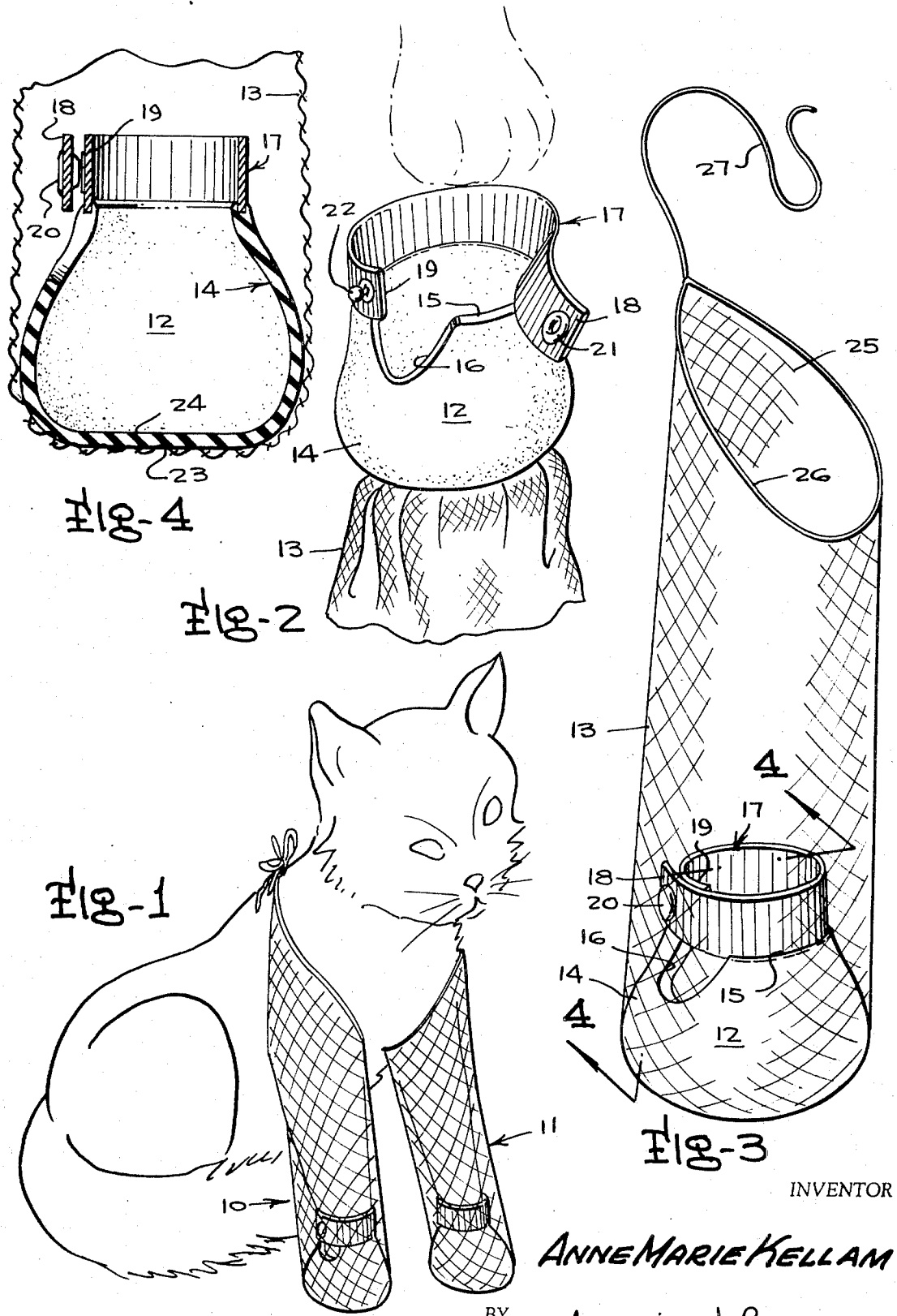

ARTICLE OF ANIMAL APPAREL

This invention relates to an article of animal apparel and more particularly to an article of animal apparel adapted to be worn by a domesticated animal such as a cat to facilitate the bathing thereof.

In the bathing of a domesticated animal such as a cat and the like, it has been the conventional practice to hold the animal with one hand while applying soap and water with the other. Due to the natural aversion of the animal to bathing, the animal usually will struggle to escape from its handler and most often use its claws in its struggle to get free. Under such circumstances, it has been found that the bathing of such animals can be facilitated by depriving them of the use of their claws temporarily.

Accordingly, it is the general object of the present invention to provide an article of animal apparel.

Another object of the present invention is to provide a novel article of animal apparel adapted to be used to facilitate the bathing of an animal.

A further object of the present invention is to provide a novel article of animal apparel which can be worn by an animal to deprive it temporarily of the use of its claws during the bathing of the animal.

A still further object of the present invention is to provide a novel article of animal apparel adapted to be worn by an animal during bathing to deprive it of the use of its claws, which can not be readily removed by the animal.

Another object of the present invention is to provide a novel article of animal apparel adapted to be worn by the animal during bathing to deprive the animal of the use of its claws, which provides a maximum exposure of the fur coat of the animal for washing.

A further object of the present invention is to provide a novel article of wearing apparel adapted to be worn by an animal during bathing to deprive the animal of the use of its claws which provides a minimum of discomfort to the animal.

A further object of the present invention is to provide a novel article of animal apparel adapted to be worn by an animal during bathing to deprive it of the use of its claws which may be readily put on and taken off of an animal.

A still further object of the present invention is to provide a novel article of animal apparel adapted to be worn by an animal during bathing to deprive it of the use of its claws, which is simple in construction, inexpensive to manufacture, and effective in performance.

Other objects and advantages of the present invention will become more apparent to those persons having ordinary skill in the art to which the present invention pertains, from the following description taken in conjunction with the accompanying drawing wherein:

FIG. 1 is a perspective view of an embodiment of the invention:

FIG. 2 is an enlarged perspective view of a portion of the embodiment shown in FIG. 1, illustrating the manner in which the article is put on the paw of an animal;

FIG. 3 is an enlarged perspective view of one-half of the article illustrated in FIG. 1;

FIG. 4 is a vertical cross-section view taken along line 4—4 of FIG. 3.

Briefly described, the present invention relates to an article of animal apparel adapted to be worn by an animal to facilitate the bathing of the animal generally including a pair of boots adapted to be worn on a pair of animal paws, and means secured to the boots and extendable along the leg and body portion of the animal and across the back thereof when the boots are worn on the paws of the animal, to retain the boots on the animal's paws. In the preferred embodiment of the invention, the boot retaining means includes sleeves of perforate or open textured material adapted to receive therethrough the legs of the animal, and ties which are adapted to extend from the sleeves along the body of the animal and tied across the back portion thereof. In addition, the boots are formed of a flexible material and are provided with cuff portions at the upper ends thereof, adapted to encompass the lower leg portions of the animal when the boots are being worn.

Referring to the drawing, there is illustrated an embodiment of the invention. Generally, the embodiment includes two substantially similar leg covering members 10 and 11 which may be put on the legs of an animal such as a cat and secured together to deprive the animal of the use of its claws. As best illustrated in FIG. 3, the leg covering member 10 consists of a boot 12 and a sleeve 13. The boot 12 includes a lower receptacle-like portion 14 formed from a flexible material such as rubber and the like, which is provided with an upper angular edge 15 having a cut-out portion 16 to permit variation in the size of the access opening of the boot, and a cuff portion 17 secured along its lower end to the upper edge 15 of boot portion 14. The cuff portion is provided with split end portions 18 and 19 adjacent the cut-out portion 16, which may be connected together by means of a snap fastener 20 having a female portion 21 disposed on the split end 18 and a male portion 22 disposed on the split end 19.

The sleeve 13 consists of a perforated or open textured material, preferably a mesh material which cannot readily be ripped by the animal's teeth, which encompasses the boot 12 at the lower end thereof, having a closed end portion 23 secured by an adhesive or other suitable fastening means to the lower wall portion 24 of the boot, and an open upper end 25 provided with a binding 26 to which there is secured a tie string 27. As best illustrated in FIGS. 1 and 3, the length of the outer side of the sleeve 13 is greater than the inner side thereof and the tie string 27 is secured to the binding 26 on the outer side of the sleeve so that the upper end of the sleeve will confrom to the contour of the animal's body when the leg of the animal is received within the sleeve and the tie string 27 is extended upwardly and across the back of the animal, and tied to a similar string of the cooperating cover member 11.

In applying the leg covering member 10 and 11 on the legs of an animal, the member 10 is first applied by inverting the sleeve member 13 and permitting it to hang freely, as illustrated in FIG. 2, holding the boot 12 in one hand, and then inserting the paw through the cuff portion 17 into the lower boot portion 12. The free ends of the cuff portion 17 are then drawn about the lower portion of the animal's leg and snapped together to prevent the boot from being pulled off the animal's paw. The boot of the cover member 11 then is applied to the other paw of the animal in a similar manner. As soon as both boots have been applied to the animal's paws, the sleeves thereof are then pulled up along the legs of the animal, encompassing the boot portions and the exposed leg portions of the animal. The tie strings 27 are then drawn across the back of the animal so that the bindings 26 comfortably engage the upper and bottom body portions of the animal, and are tied together across the back of the animal. The animal then is ready for bathing and will be deprived of the use of its claws by virtue of its paws being received within the boots 12 and the animal's inability to readily remove such boots during bathing.

To provide the least discomfort to the animal, all of the components of the wear article may be flexible and preferably resilient to permit maximum freedom of movement of the animal. Also, the cuff portion 17 may consist of an elastic material to firmly grip the legs of the animal and prevent the animal from removing the boots.

With the leg covering members 10 and 11 applied to the animal as described, the handler may then hold the animal with one hand while applying soap and water with the other without having to contend with the claws of the animal as it struggles to escape. As soon as the bathing has been completed, the leg coverings 10 and 11 can easily be removed simply by untying the tie strings 27, dropping the sleeve members 13 down below the cuff portions 17 of the boots, unsnapping the snap fasteners 20 and removing the boots from the paws of the animal.

From the foregoing detail description, it will be evident that there are a number of changes, adaptations and modifications of the present invention which come within the provence of those skilled in the art. However, it is intended that all such variations not departing from the spirit of the invention be considered as within the scope thereof as limited solely by the appended claims.

I claim:

1. Articles of animal apparel adapted to facilitate the bathing particularly of claw-pawed animals, comprising a pair of boots adaptable to be worn on a pair of the animals' paws so as to substantially enclose the claw portions thereof; flexible sleeve-like members of open mesh-type perforated material fixedly connected with said boots and adaptable to enclose the animals' legs adjacent said paws when said boot apparel is being worn; said sleeve-like members extendable along the leg and having fastening means for connecting said sleeve-like members across the back of said animal to retain said boots thereon when being worn; and said sleeve-like members providing a minimum of discomfort by being made of said open mesh-type material so as not to be unduly confining and not readily gripped and ripped by the animals' teeth.

2. The apparel articles as defined in claim 1, wherein said boots are formed of a resiliently flexible, non-perforated material in the area adapted to encompass the claw portions of said paws.

3. Articles of apparel as defined in claim 1, wherein said boots are formed of a flexible, non-perforated material in the area adapted to encompass the claw portions of said paws, said boots each being provided with fastenable cuff portions at upper ends thereof to firmly temporarily encompass lower leg portions of said animal and inwardly and independent of said open mesh sleeve-like members.

4. Articles of apparel as defined in claim 1 wherein said sleeve-like members have integrally closed lower, boot-encompassing ends secured to said boots at a lower wall or sole portion of said boots.

5. Articles of apparel as defined in claim 1, wherein said sleeve-like members are provided with open upper paw-entry ends having a peripheral reinforcement binding thereon, said sleeve-like members being of a greater length at an outer side thereof than at an opposite side, said outer length portions adaptable to flexibly conform to and overlay upper leg and adjacent body portions of said animal when said sleeve-like members are fastened together across the back of said animal.

6. Articles of apparel as defined in claim 3 wherein said boots each are further of generally symmetrically uniform and generally hemispherical pouch-like shape in the lower portions thereof, and include a cut-out or notch portion in an upper portion adjacent a fastenable portion of said cuff portions, said cut out portion providing variation in size of paw access to said boots.

7. Articles of apparel as defined in claim 3, wherein said fastenable cuff portions include split portions adapted to overlay one another and including complementary snap fastening means thereon.

* * * * *